United States Patent Office 3,666,420
Patented May 30, 1972

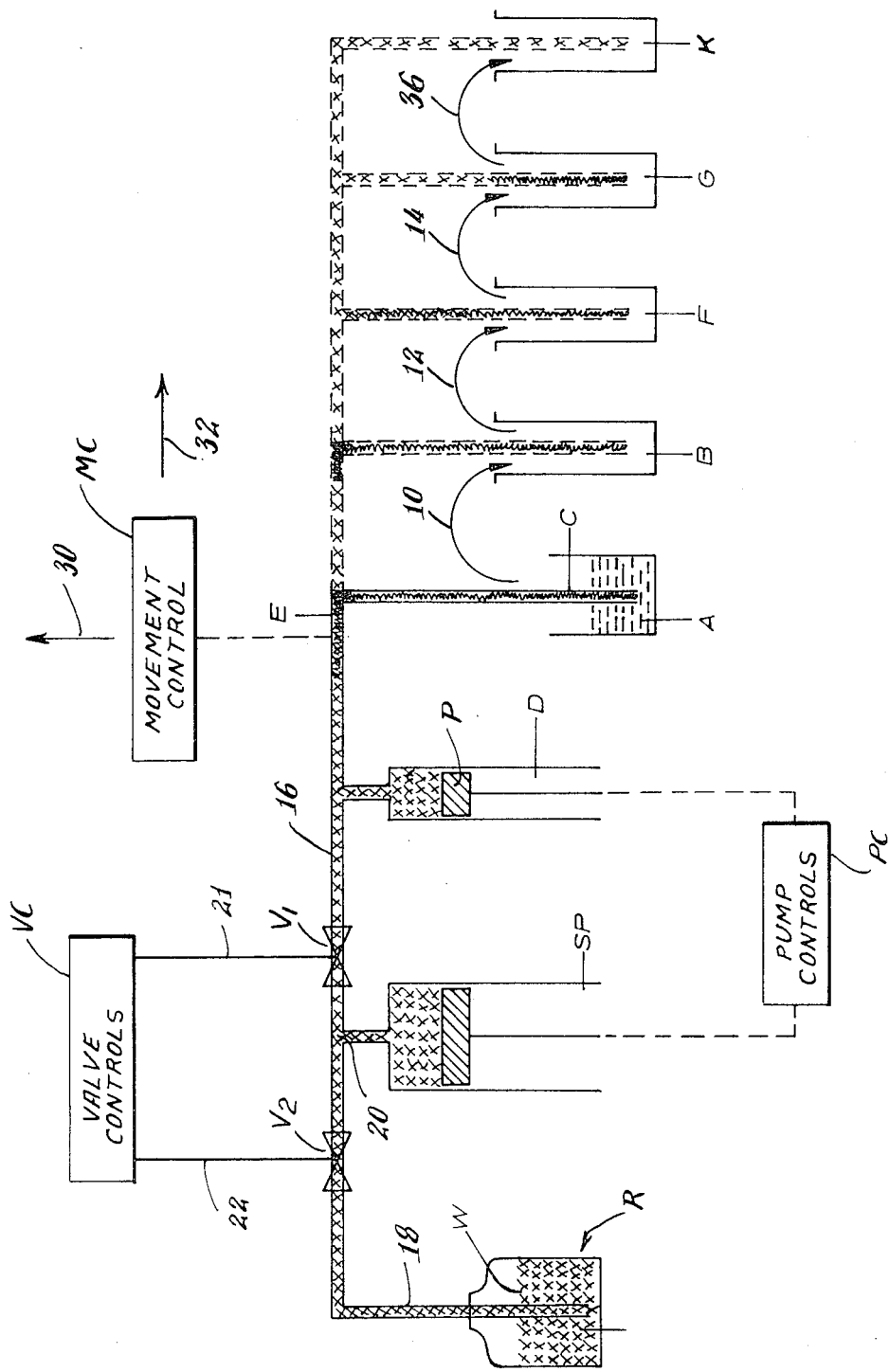

3,666,420
APPARATUS FOR AUTOMATICALLY CARRYING OUT CHEMICAL ANALYSES
Peter Paatzsch, Hildegardring, Germany, assignor to Bodenseewerk Perkin-Elmer & Co. G.m.b.H., Uberlingen (Bodensee), Germany
Filed Nov. 9, 1970, Ser. No. 87,956
Int. Cl. F16k *19/00;* G01n *1/14*
U.S. Cl. 23—253 R                                         2 Claims

ABSTRACT OF THE DISCLOSURE

A measuring sample transfer or "dosing" device for use in an automatic analysis apparatus of the type in which each of a series of sample vessels contains a different liquid sample, and measured amounts of sample from each sample vessel are to be transferred into a plurality of reaction vessels associated with each such sample vessel. The disclosed sample "dosing" device includes a first sample measuring pump directly connected to the sample intake (and discharge) line (which is to be introduced into a sample vessel to take up sample and then into each of its associated reaction vessels in turn to discharge a measured amount of the sample), and is connected by a separate supply line having a first and second control valve to a supply of wash liquid (or reagent); and a (second) scavenging pump is connected to this supply line at a point intermediate these two valves. With the system filled with wash liquid but both pumps in their discharge (empty) position, the first valve is closed and the (first) measuring pump sucks up sample from the sample vessel through its intake line, while the scavenging pump is filled with wash liquid by means of the supply line. If the sample intake line is of greater volume than the intake stroke of the sample pump, then no sample reaches the pump itself. The intake line is then introduced into each associated reaction vessel in turn and a measured amount of sample is discharged in each such reaction vessel. Finally, the first valve is opened while the second valve is closed, a discharge of the scavenging pump clears the intake line of any residual sample (either into the last reaction vessel or an additional waste vessel). The cycle than may be repeated for the next sample vessel without danger of contamination by the sample just transferred.

---

This invention relates to apparatus for carrying out automatic chemical analyses, and in particular to the transferring of samples from each of an array of liquid sample vessels into a plurality of reaction vessels associated with each sample vessel. The sample transferring or "dosing" apparatus is adapted to be used in apparatus for automatically carrying out chemical analyses of the type comprising an array of sample vessels, each containing different samples, a group of reaction vessels associated with each sample vessel, a sample metering or dosing pump, means for moving the sample vessels relative to the dosing pump, so as to allow control means to move and actuate the dosing pump so that it sucks up an amount of sample from each sample vessel and delivers a metered (or "dosed," that is, measured) amount of each sample into the plurality of reaction vessels associated with each particular sample vessel.

The present invention is particularly adapted to replace the sample "dosing" or metering part of the automatic chemical analysis apparatus shown and claimed United States patent application, Ser. No. 689,516, filed Dec. 11, 1967, and now U.S. Pat. No. 3,615,230, issued Oct. 26, 1971 and assigned to the assignee of the instant application, said prior application corresponding to British specification 1,202,079, published Aug. 12, 1970. In that apparatus, the transport device is a turntable on which the sample vessels are arranged circumferentially and each sample vessel has radially associated therewith a plurality (of say, four) reaction vessels, which therefore are in a series (of four) of corresponding circular arrangements; the metering or dosing pump operates in a manner known per se by a digitally controlled piston actuated, for example, by a stepping motor; the dosing pump above the turntable, is introduced into one sample vessel by movement control means, and then is moved to each of the (say, four) reaction vessels associated with that sample vessel, and caused to deliver a "dosed" (or measured) amount of the sample to each reaction vessel associated (i.e., on the same radius of the circular turntable) with that sample vessel. The turntable is then moved to the next sample and the process repeated.

In order to avoid contamination of the next following sample by the previous sample, the apparatus provides a waste vessel, and prior to each sample intake, the dosing pump discharges one pump filling from the sample vessel about to be used into a waste vessel so as to rinse it prior to use. In the arrangement described in that apparatus this waste vessel is formed by a drain extended all around the turntable. The present invention provides an improved different sample dosing arrangement which may replace that of said previous apparatus.

An arrangement for metering and diluting a sample liquid is also known which comprises: a pipette adapted to be filled with a specific amount of sample liquid and a measuring chamber adapted to be filled with a specific amount of diluting liquid, in which a valving device, in a first position thereof, communicates the pipette with a vacuum source and the variable volume measuring chamber with a supply of diluting liquid, and, in the other position thereof, communicates the measuring chamber with the pipette so that the diluting liquid contained in the measuring chamber is caused to flow off through the pipette and rinse the sample liquid out of the same. In this prior arrangement the vacuum source is provided by a waste bottle connected to a vacuum pump, and the measuring chamber is a reagent dosing pump. With such an arrangement, in a first position, a specific amount of diluting liquid is sucked in by the reagent dosing pump, while a defined amount of a sample liquid is sucked into the pipette via the vacuum source. Then, a change-over is effected. The reagent dosing pump is communicated with the pipette and the diluting liquid expelled by the reagent dosing pump drives the sucked-in sample liquid out of the pipette and simultaneously rinses the pipette with the diluting liquid subsequently discharged.

It is also prior art, instead of providing a waste bottle under vacuum, to provide a dosing pump which sucks in a defined amount of sample liquid, the whole system initially being filled with a wash liquid. If, then, from a first system a defined amount of sample shall be transferred to a second system, a suction nose dips into the first vessel, and the dosing pump for the sample dosing sucks a pre-established amount of sample into the suction "nose" or intake line to the dosing pump. Then, this suction nose is placed over the second vessel and the sample sucked in from the first vessel is discharged again with the dosing pump. Immediately thereafter, a defined amount of wash liquid is forced through the suction nose by the reagent dosing pump so that no residues are present anymore in the suction nose or the intake line originating from the transferred sample from the first vessel. With this prior arrangement a transfer can be effected only from a first vessel into a single second vessel (during each cycle of operation).

It is an object of the invention, to provide, for incorporation in automatic chemical analysis apparatus of the type mentioned above (and in particular of the type shown in the above mentioned copending United States application and corresponding published British specification), a novel sample dosing which avoids contamination of the sample by the preceding sample in an advantageous manner.

It is a more specific object of the invention to effect a rinsing of the sampling system of the type described above in such a manner that the required amounts of sample can be kept at a minimum.

It is a further object of the invention to provide a device of the type described above in which the time required for each sample dosing can be reduced.

According to the invention these objects are attained by providing that the sample dosing pump is connected to a container of wash liquid or reagent via a first or metering valve and a second or scavenging control valve in series; that a scavenging pump is connected to a point between the first metering and the second scavenging valves; that the volume of the intake line of the dosing pump (i.e., the line opposite to that connected to the wash liquid through the two valves) including a suction nose introducible into the vessels is greater than the maximum utilized stroke volume of the dosing pump; that the first metering valve between the dosing and scavenging pumps is closed during the suction stroke of the dosing or metering pump and, during the time the first metering valve is closed, the second scavenging valve between the scavenging pump and supply of wash liquid or reagent opens and the scavenging pump executes its suction stroke so as to fill the scavenging pump with wash liquid; that the dosing or metering pump executes a measured expulsion, delivery or sample dosing stroke into each reaction vessel in turn (the end or "suction nose" of the original intake line being moved to successive reaction vessels between such sample dosing strokes), the second scavenging valve being closed at least by the end of this sample dosing phase; and that following the sample dosing strokes of the dosing pump, the first metering valve is again opened, and an exhaust stroke of the scavenging pump is initiated by the control means, the scavenging pump having a discharge stroke volume which is at least as large as the non-dosed residual volume of the sucked-in sample liquid in the intake line, so as to insure complete rinsing of the remaining sample liquid out of the system.

According to the present invention, rinsing is not effected (as is described in the above-mentioned U.S. application and published British specification) by an amount of sample liquid sucked-in prior to the actual dosing and discharged into a waste vessel, but by a separate rinsing liquid in a manner analogous to the diluent washing of a "diluter" system. In this manner the amount of sample liquid required for the analysis is reduced, the waste vessel can be dispensed with in many cases, and the time period required for the dosing and transfer actions is also reduced.

The last operation, in which the scavenging pump discharges the last part of the sample, may be into the last reaction vessel as the last sample dosing action, causing addition of diluting liquid or reagent. Thus, the reagent or diluting medium simultaneously may serve as a wash liquid. Sometimes, however, it is not desired to dilute the sample supplied to the last sample vessel or to add a reagent thereto. In such as case, an additional waste vessel may be provided and the exhaust stroke of the scavenging pump, with the second scavenging valve closed, can be initiated with the end or suction nozzle in communication with this waste vessel.

An exemplary embodiment of the invention will now be described in greater detail with reference to the accompanying drawing, in which the sample dosing system according to the invention is illustrated schematically.

In the exemplary schematic arrangement as sample vessel A contains a liquid sample desired to be delivered or "dosed" into sample vessels B, F and G in measured amounts. This is accomplished by means of a metering or dosing pump D which sucks up sample liquid from the vessel A through a suction nozzle C and an inlet line E. Thereafter, the suction nozzle C, as indicated, is dipped into the various vessels B, F and G and a respective dosed amount is delivered by means of the dosing pump D. The dosing pump D may be provided with a piston which is adjustable via a stepping motor in the same manner (and utilizing the same structure for example) as in the above-mentioned U.S. patent application and published British patent specification. Thereafter, the nozzle C, as indicated by the curved arrows 10, 12 and 14 may be dipped into the various reaction vessels B, F and G in turn, and a measured amount of sample liquid expelled by upward movement of the piston P of the dosing or metering pump (this operation being explained fully hereinafter). In addition to being connected to inlet line E (and therefore nozzle C), the pump D is connected through line 16 having two control valves $V_1$ and $V_2$ to a large reservoir R containing a wash fluid W (which may be either pure wash liquid, such as distilled water, a different diluent or even a chemical reagent), as by a downwardly extending left-hand end portion 18. A scavenging pump SP is connected to the tubing 16 at a point 20 between the two valves $V_1$ and $V_2$. The valves $V_1$ and $V_2$ (which may be solenoid valves, for example) are individually controlled as schematically illustrated at 21 and 22, respectively, as by any conventional valve control means VC, so as to be opened and closed at the correct desired times.

In general, the reservoir R will be completely stationary; the sample vessel A and the reaction vessels B, F, G and (the last reaction vessel or individual waste vessel) K will be mounted on a transport means (such as the turntable shown in the above-mentioned U.S. patent application or published British specification) so as to allow similar linear arrays of sample and reaction vessels to be moved into operative position after a complete cycle of operation has been completed; and at least the intake tubing E and its dosing nozzle or end C will be movable both vertically as indicated schematically by arrow 30 (so as to clear the top of vessels A, B, E, G and K), and horizontally as indicated schematically by arrow 32 by any mechanical moving and control means MC. Thus either all of the dosing apparatus (i.e., all of the device except for the reservoir R and the vessels A, B, F, G and H) may be on a vertically and horizontally movable supporting arm, or the intake line E may be the only moved element (both vertically and horizontally) as by being made both flexible and extensible (e.g., by being a loosely coiled rubber tubing).

OPERATION

At the start of a sample dispensing cycle, the whole system is filled with wash liquid. Then, the suction nozzle C is dipped into the sample vessel A, the first dosing valve $V_1$ being closed and the second scavenging valve $V_2$ being open. Dosing pump D and scavenging pump SP now execute their suction strokes under control of a pump control PC schematically shown in the drawing, whereby the wash liquid in the intake line E and the suction nozzle C is sucked back and sample liquid from vessel A follows so as to fill at least a substantial part of the intake line, as indicated in the drawing. During this period, the suction stroke of the scavenging pump SP causes wash liquid to be sucked into the scavenging pump.

Now, the suction nozzle C is successively lowered into the reaction vessels B, F and G and each time a metered amount of sample liquid is expelled by the dosing pump D. It may be noted that the sample liquid does not pass into the cylinder chamber of the dosing pump D, but is only sucked up into the intake line E and the suction nozzle C.

Finally, the suction nozzle is moved over a waste vessel K as indicated by arrow 36. Here, the residual sample liquid from the suction nose C is expelled and subsequently, the valve $V_1$ opens, while the valve $V_2$ is closed, if it has not already been closed (since this closing may occur at any time prior to the next operation). Then the scavenging pump SP causes wash liquid to follow, which rinses any residue of the sample liquid out of the system, so that the system is now filled again completely with pure wash liquid. Now, the same complete cycle can be repeated with another sample, which cannot be contaminated by residues of the just dosed sample. The movement control obviously lifts at least the intake line E and the suction nozzle C between cycles to allow a new set of vessels (A, B, F, G and H) to be moved into position.

Since more sample liquid is sucked in by the dosing pump D than will be delivered thereafter into the reaction vessels B, F and G, so that after the dosing action a sample residue still remains in the suction nozzle C, it is ensured that the sample liquid dosed into the reaction vessels B, F, G will not directly come into contact with the wash liquid. The residue of sample liquid in the suction nose constitutes a "buffer" between dosed sample liquid and wash liquid.

What is claimed is:

1. In apparatus for carrying out automatic chemical analyses of the type having a series of sample vessels, each having a plurality of reaction vessels associated therewith for receiving a measured amount of sample fluid from its associated sample vessel, each sample vessel and its associated reaction vessels being moved into operative position relative to a sample dosing device for transferring a portion of the sample fluid from each sample vessel as a measured amount into each of the reaction vessels associated therewith, the improvement in said sample dose transferring device comprising:

a container (R) for wash liquid (W);
a sample metering pump (D);
first conduit means (16) connecting said metering pump to said wash liquid container;
a first metering control valve ($V_1$) and a second scavenging control valve ($V_2$) in said first conduit means between said metering pump and said wash liquid container;
a scavenging pump (SP) connected to said first conduit means at a point between said first and said second valves;
an intake line (E) connected to said sample metering pump (D) and terminating in a suction nozzle (C), adapted to be introduced into a sample vessel (A) and the various reaction vessels (B, F, G) associated therewith;
the combined internal volume of said intake line (E) and suction nozzle (C) being greater than the maximum utilized volume displaced by intake stroke movement of said metering pump (D);
valve control means for closing said first metering control valve ($V_1$) between said metering pump (D) and said scavenging pump (SP), and for opening said second scavenging control valve ($V_2$) between said scavenging pump and said container (R) of wash liquid (W) during a first part of an operation cycle;
pump control means for causing both said scavenging pump (SP) and said metering pump (D) to execute their suction intake strokes while said suction nozzle is in said sample vessel (A) during said first part of the operation cycle, thereby causing said suction nozzle and at least part of said intake line to become filled with sample liquid, while said scavenging pump becomes full of wash liquid;
means (MC) for moving said suction nozzle (C) successively into each of the reaction vessels (B, F, G), said pump control means causing the piston (P) of said metering pump to make successive measured expulsion strokes when said suction nozzle is in each of said reaction vessels, so as to deliver measured quantities of sample liquid to each of said reaction vessels in turn;
said valve control means opening said first valve ($V_1$) upon completion of all such measured sample liquid deliveries and insuring closing of said second valve ($V_2$) at least after such completion, said pump control means (PC) causing said scavenging pump (SP) to expel a quantity of wash liquid at least somewhat greater than any residual sample liquid remaining in said intake line (E) and said suction nozzle (C);
whereby all sample fluid is expelled from the entire sample transferring device, which therefore contains only wash fluid and is therefore ready for the next sample transfer operation without danger of contamination thereof by any sample residue from the last just completed sample transfer operation.

2. An apparatus according to claim 1, further comprising:

a waste vessel (K);
said means (MC) for moving said suction nozzle also causing said nozzle to move to said waste vessel after completion of delivery of all the measured sample liquid deliveries into said reaction vessels and before said scavenging pump expelling of wash liquid,
whereby said scavenging pump expelling stroke causes any residual sample liquid and some of the wash liquid to be discharged into said waste vessel (K) during the last part of an operation cycle.

References Cited

UNITED STATES PATENTS 3,192,969   7/1965   Baruch et al. _____ 141—90

MORRIS O. WOLK, Primary Examiner
R. M. REESE, Assistant Examiner

U.S. Cl. X.R.

73—423 A, 425.6; 137—240, 567; 141—90, 104